(12) United States Patent
Han et al.

(10) Patent No.: US 11,080,754 B1
(45) Date of Patent: Aug. 3, 2021

(54) PROMOTIONAL SYSTEM INTERACTION TRACKING

(71) Applicant: Groupon, Inc., Chicago, IL (US)

(72) Inventors: Angela Han, Chicago, IL (US); Zahra Ferdowsi, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 399 days.

(21) Appl. No.: 14/788,474

(22) Filed: Jun. 30, 2015

(51) Int. Cl.
*G06Q 30/02* (2012.01)

(52) U.S. Cl.
CPC ..... *G06Q 30/0267* (2013.01); *G06Q 30/0255* (2013.01)

(58) Field of Classification Search
CPC .......... G06Q 30/0267; G06Q 30/0255
See application file for complete search history.

(56) References Cited

U.S. PATENT DOCUMENTS

| 9,665,556 | B1* | 5/2017 | Sutariya | G06F 16/9535 |
|---|---|---|---|---|
| 2002/0107853 | A1* | 8/2002 | Hofmann | G06F 16/335 |
| 2008/0010133 | A1* | 1/2008 | Pyhalammi | G06F 16/955 |
| | | | | 705/14.58 |
| 2008/0082627 | A1* | 4/2008 | Allen | G06Q 10/10 |
| | | | | 709/217 |
| 2010/0023874 | A1* | 1/2010 | Frohwein | G06F 3/048 |
| | | | | 715/747 |
| 2010/0037168 | A1* | 2/2010 | Thayne | G06F 40/166 |
| | | | | 715/769 |
| 2011/0302025 | A1* | 12/2011 | Hsiao | G06Q 30/0283 |
| | | | | 705/14.42 |
| 2012/0290433 | A1* | 11/2012 | England | G06Q 30/0282 |
| | | | | 705/26.7 |
| 2013/0103740 | A1* | 4/2013 | Tully | H04N 21/44245 |
| | | | | 709/203 |
| 2014/0052617 | A1* | 2/2014 | Chawla | G06Q 10/10 |
| | | | | 705/39 |
| 2014/0095276 | A1* | 4/2014 | Sutcliffe | G07F 17/42 |
| | | | | 705/14.1 |
| 2014/0164350 | A1* | 6/2014 | Landa | H04L 67/28 |
| | | | | 707/709 |

(Continued)

OTHER PUBLICATIONS

U.S. Appl. No. 62/140,957, filed Mar. 31, 2015, In re: Chowdhury entitled Universal Relevance Service Framework, U.S. Appl. No. 62/140,957.

*Primary Examiner* — Sam Refai
*Assistant Examiner* — Kyle G Robinson
(74) *Attorney, Agent, or Firm* — Alston & Bird LLP

(57) ABSTRACT

Techniques for providing webpages based on tracking consumer device interactions are discussed herein. Some embodiments may include one or more servers configured to: receive a request for access to a promotion webpage from a consumer device, wherein the request includes a consumer device cookie and the promotion webpage includes an indication of a promotion; in response to receiving the request for access to the promotion webpage, generate the promotion webpage including widgets; generate clickstream data based on tracking widget views of the widgets within the promotion webpage; associate the clickstream data with the consumer device cookie; and generate widget analytic data based on the clickstream data. The widget analytic data may then be used to populate webpages with widgets to optimize various criteria, such as widget views or promotion purchases.

26 Claims, 11 Drawing Sheets

(56) References Cited

U.S. PATENT DOCUMENTS

| | | | |
|---|---|---|---|
| 2015/0269642 A1* | 9/2015 | Cai ................... | G06Q 30/0613 705/14.49 |
| 2016/0012485 A1* | 1/2016 | Dong ................. | G06Q 30/0263 705/14.6 |

* cited by examiner

PROMOTIONAL SYSTEM INTERACTION TRACKING

FIELD

Embodiments of the invention relate, generally, to techniques for generating promotional webpages based on consumer device interactions.

BACKGROUND

Promotional systems provide promotions associated with merchants to consumer devices through various electronic communication channels such as webpages. The effectiveness of promotional offers can depend on factors such as the features and arrangement of webpage components, or widgets. In this regard and others as discussed herein, areas for improving current techniques have been identified.

BRIEF SUMMARY

Through applied effort, ingenuity, and innovation, solutions to improve such systems have been realized and are described herein. Various embodiments of the present invention are directed to improved apparatuses, methods, and computer readable media for programmatically generating promotional webpages based on consumer device interactions.

Some embodiments may include a system, with one or more servers configured to: establish a wireless connection with a consumer device via a network; receive a request for access to a promotion webpage form the consumer device, wherein the request includes a consumer device cookie and the promotion webpage includes an indication of a promotion; in response to receiving the request for access to the promotion webpage, generate the promotion webpage including widgets; generate clickstream data based on tracking widget views of the widgets within the promotion webpage; associate the clickstream data with the consumer device cookie; generate aggregate clickstream data based on combining the clickstream data associated with consumer device cookie with clickstream data associated with one or more other consumer device cookies; and generate widget analytic data based on the aggregated clickstream data; and receive a second request for access to a second promotion webpage; and in response to receiving the second request, generate the second promotion webpage based on the widget analytic data.

In some embodiments, the one or more servers configured to generate the clickstream data based on tracking widget views of the widgets may include the one or more servers being configured to: tag the widgets within the promotion webpage; send instructions that configure the consumer device to monitor the scrolling of the promotion webpage and determine widgets as being viewed when the widgets are presented on a display of the consumer device; and receive second clickstream data from the consumer device indicating viewed widgets.

In some embodiments, the one or more servers configured to generate the clickstream data based on tracking widget views of the widgets may include the one or more servers being configured to: associate the widgets with scrolling depths the promotion webpage; send instructions that configure the consumer device to monitor the scrolling of the promotion webpage and determine widgets as being viewed when the widgets are presented on the screen of the consumer device; and receive second clickstream data from the consumer device indicating scrolling behavior within the promotion webpage.

In some embodiments, the one or more servers may be further configured to: determine a traffic source associated with the request for access to the promotion webpage; associate the clickstream data with the traffic source; and generate the widget analytic data based on the traffic source associated with the clickstream data.

In some embodiments, the promotion webpage may include a buy button configured to initiate purchase of the promotion. The one or more servers may be further configured to, in response to receiving consumer device input indicating selection of the buy button, associate the promotion with the consumer device cookie.

In some embodiments, the one or more servers may be further configured to, in response to receiving consumer device input indicating selection of the buy button: generate a checkout webpage including second widgets; generate second clickstream data based on tracking widget views of the second widgets within the checkout webpage; and associate the second clickstream data with the consumer device cookie; generate second aggregate clickstream data based on combining the aggregate clickstream data with the second clickstream data and second clickstream data associated with the one or more other consumer device cookies; and generate second widget analytic data based on the second aggregated clickstream data.

In some embodiments, the checkout webpage may include a checkout button; and the one or more servers may be further configured to, in response to receiving consumer device input indicating selection of the checkout button, facilitate purchase of one or more promotions associated with the consumer device cookie.

In some embodiments, the consumer device cookie may include at least one of a consumer identifier or a session identifier. The one or more servers configured to associate the clickstream data with the consumer device cookie may include the one or more servers being configured to associate the clickstream data with the at least one of the consumer identifier or a session identifier.

In some embodiments, the one or more servers configured to generate the widget analytic data based on the aggregated clickstream data may include the one or more servers being configured to determine viewership per widget.

In some embodiments, the one or more servers configured to generate the widget analytic data based on the aggregated clickstream data may include the one or more servers being configured to determine widget viewership for different traffic sources.

In some embodiments, the one or more servers configured to generate the widget analytic data based on the aggregated clickstream data may include the one or more servers being configured to determine widget viewership for different consumer segments.

In some embodiments, the one or more servers configured to generate the widget analytic data based on the aggregated clickstream data may include the one or more servers being configured to determine widget viewership for purchasers and non-purchasers of the promotion.

In some embodiments, the one or more servers are further configured to: determine purchase funnel webpages including the promotion webpage and a checkout webpage, the purchase funnel webpage including widget slots; determine a priority of the widget slots across the purchase funnel webpages; determine a widget ranking of the widgets based on the widget analytic data; and populate the widget slots based on the widget ranking.

In some embodiments, the one or more servers may be further configured to: generate the consumer device cookie; and provide the consumer device cookie to the consumer device via the network.

Some embodiments may include method, comprising, by one or more servers: establishing a wireless connection with a consumer device via a network; receiving a request for access to a promotion webpage form the consumer device, wherein the request includes a consumer device cookie and the promotion webpage includes an indication of a promotion; in response to receiving the request for access to the promotion webpage, generating the promotion webpage including widgets; generating clickstream data based on tracking widget views of the widgets within the promotion webpage; associating the clickstream data with the consumer device cookie; generating aggregate clickstream data based on combining the clickstream data associated with consumer device cookie with clickstream data associated with one or more other consumer device cookies; and generating widget analytic data based on the aggregated clickstream data; and receiving a second request for access to a second promotion webpage; and in response to receiving the second request, generating the second promotion webpage based on the widget analytic data.

In some embodiments, generating the clickstream data based on tracking widget views of the widgets may include: tagging the widgets within the promotion webpage; sending instructions that configure the consumer device to monitor the scrolling of the promotion webpage and determine widgets as being viewed when the widgets are presented on a display of the consumer device; and receiving second clickstream data from the consumer device indicating viewed widgets.

In some embodiments, generating the clickstream data based on tracking widget views of the widgets may include: associating the widgets with scrolling depths the promotion webpage; sending instructions that configure the consumer device to monitor the scrolling of the promotion webpage and determine widgets as being viewed when the widgets are presented on the screen of the consumer device; and receiving second clickstream data from the consumer device indicating scrolling behavior within the promotion webpage.

In some embodiments, the method may further include, by the one or more servers: determining a traffic source associated with the request for access to the promotion webpage; associating the clickstream data with the traffic source; and generating the widget analytic data based on the traffic source associated with the clickstream data.

In some embodiments, the promotion webpage may include a buy button configured to initiate purchase of the promotion. The method may further include, in response to receiving consumer device input indicating selection of the buy button, associating the promotion with the consumer device cookie.

In some embodiments, the method may further include, by the one or more servers and in response to receiving consumer device input indicating selection of the buy button: generating a checkout webpage including second widgets; generating second clickstream data based on tracking widget views of the second widgets within the checkout webpage; and associating the second clickstream data with the consumer device cookie; generating second aggregate clickstream data based on combining the aggregate clickstream data with the second clickstream data and second clickstream data associated with the one or more other consumer device cookies; and generating second widget analytic data based on the second aggregated clickstream data.

In some embodiments, the checkout webpage may include a checkout button. The method further may further include, by the one or more servers and in response to receiving consumer device input indicating selection of the checkout button, facilitating purchase of one or more promotions associated with the consumer device cookie.

In some embodiments, the consumer device cookie may include at least one of a consumer identifier or a session identifier; and associating the clickstream data with the consumer device cookie includes associating the clickstream data with the at least one of the consumer identifier or a session identifier.

In some embodiments, generating the widget analytic data based on the aggregated clickstream data may include determining viewership per widget.

In some embodiments, generating the widget analytic data based on the aggregated clickstream data may include determining widget viewership for different traffic sources.

In some embodiments, generating the widget analytic data based on the aggregated clickstream data may include determining widget viewership for different consumer segments.

In some embodiments, generating the widget analytic data based on the aggregated clickstream data may include determining widget viewership for purchasers and non-purchasers of the promotion.

In some embodiments, the method may further include, by the one or more servers: determining purchase funnel webpages including the promotion webpage and a checkout webpage, the purchase funnel webpage including widget slots; determining a priority of the widget slots across the purchase funnel webpages determining a widget ranking of the widgets based on the widget analytic data; and populating the widget slots based on the widget ranking.

In some embodiments, the method may further include, by the one or more servers: generating the consumer device cookie; and providing the consumer device cookie to the consumer device via the network.

Some embodiments may include methods, while other embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
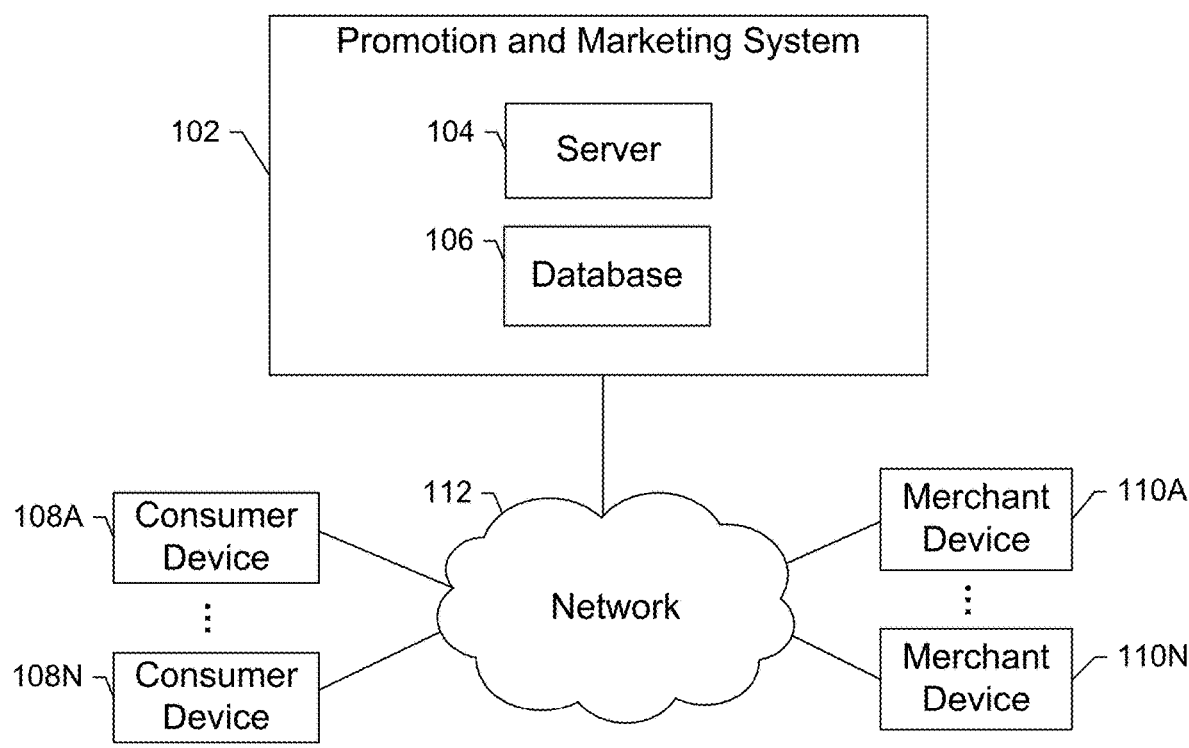
Figure 2:
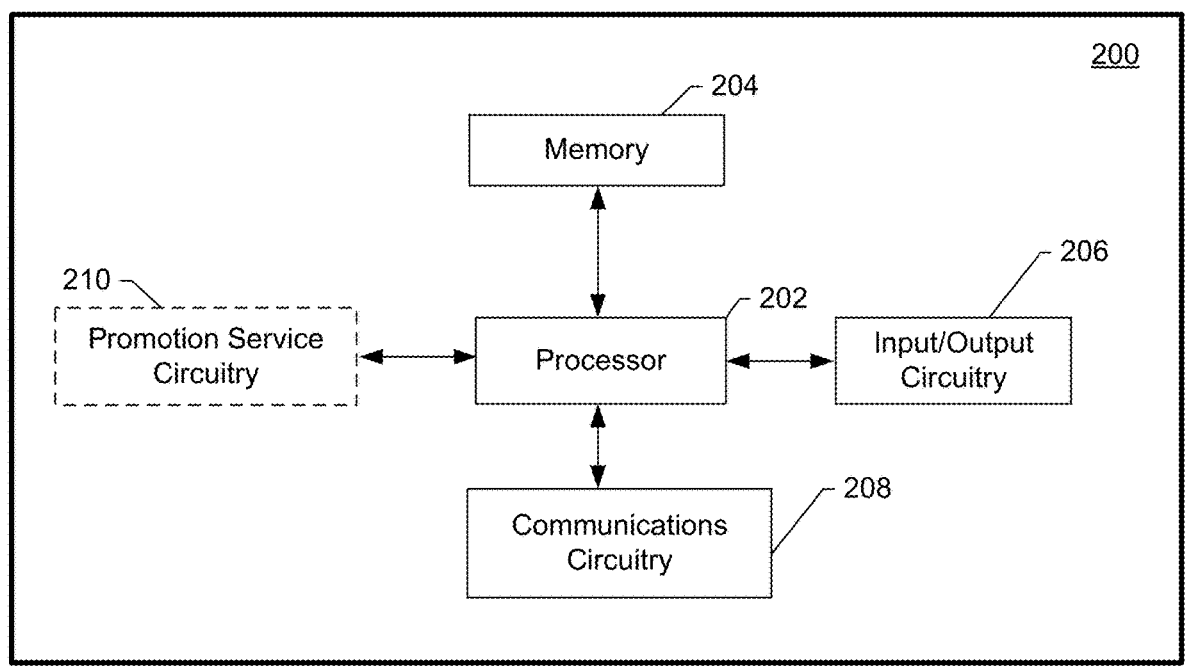
Figure 3:
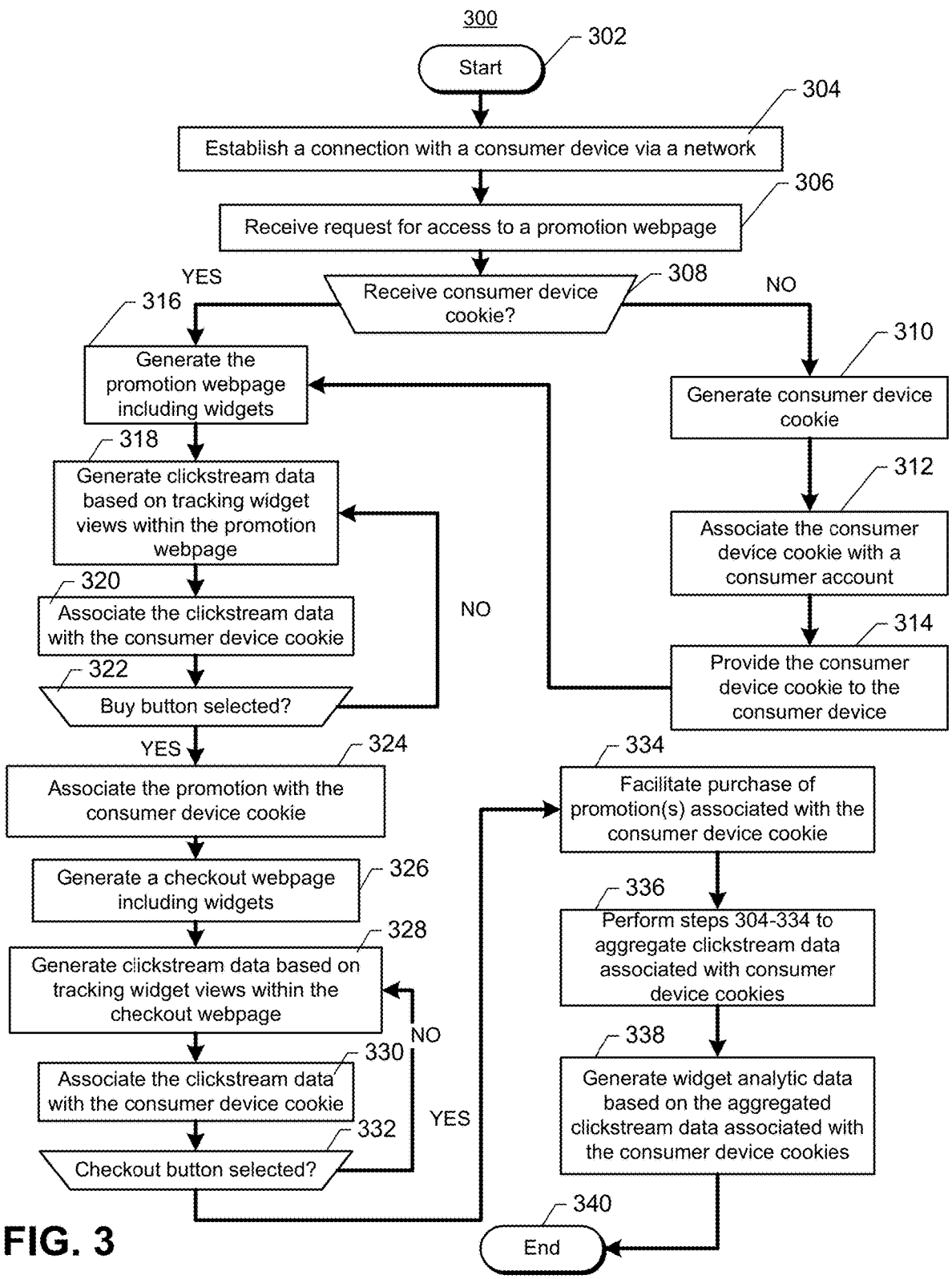
Figure 4:
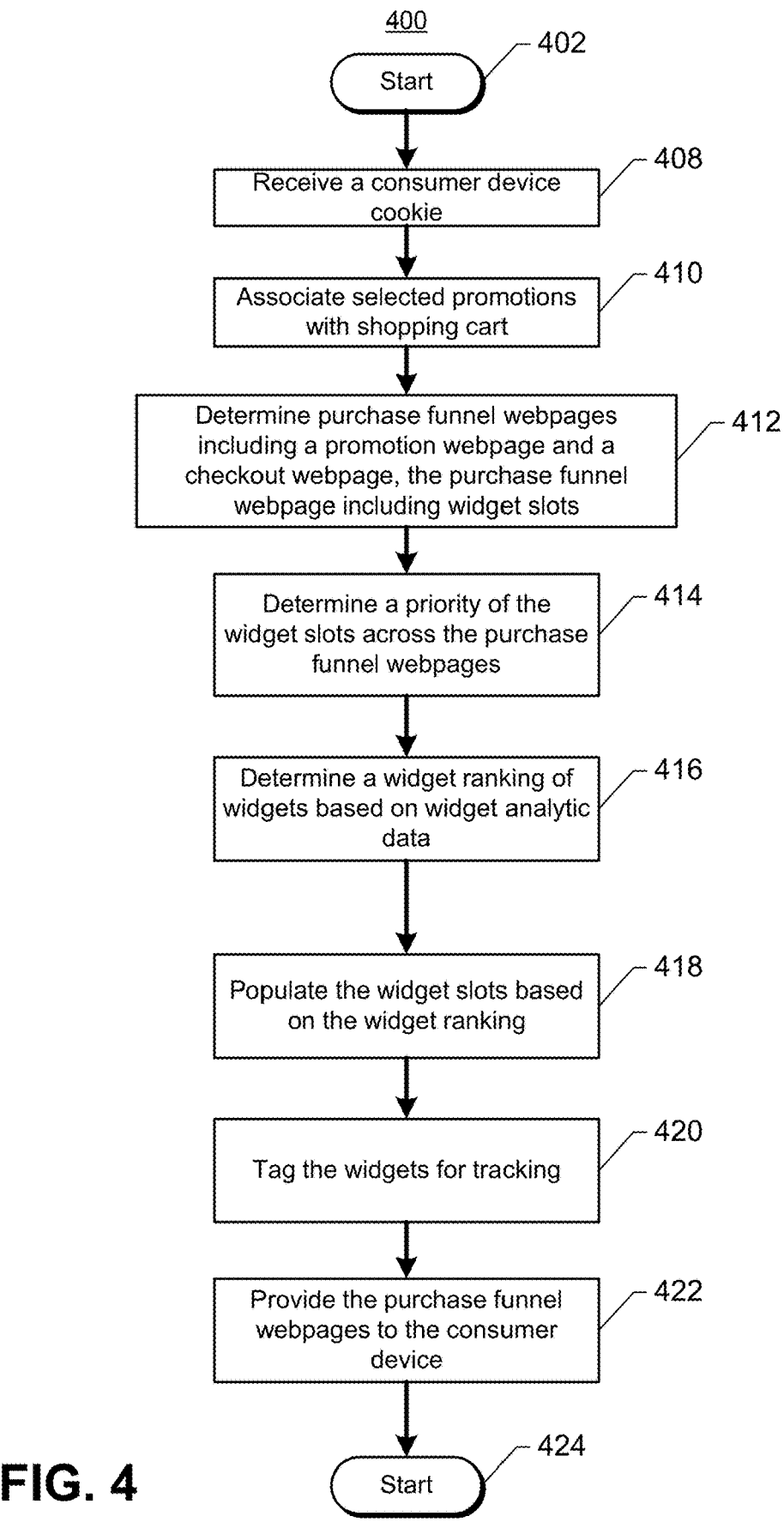
Figure 5:
Figure 6:
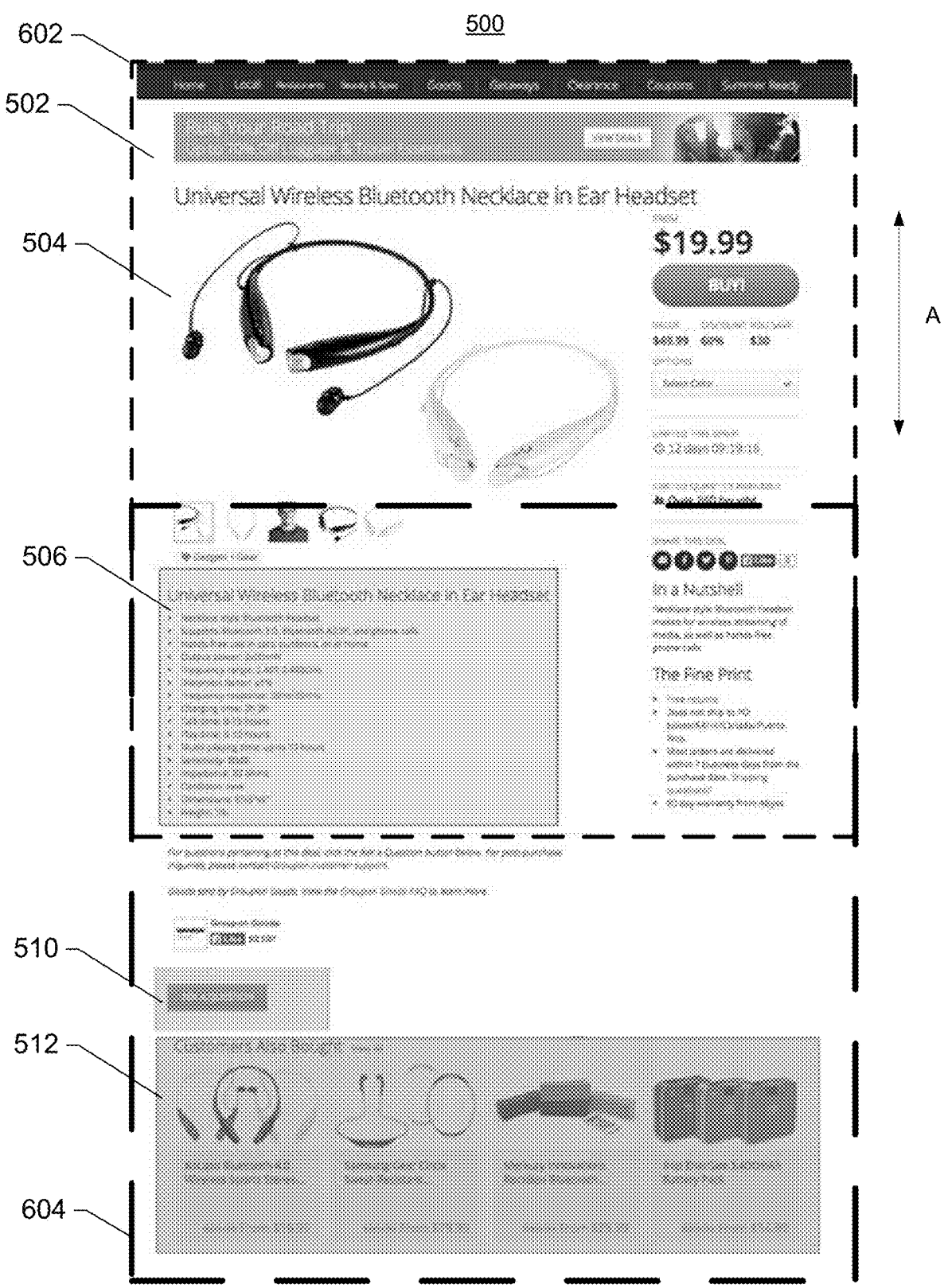
Figure 7:
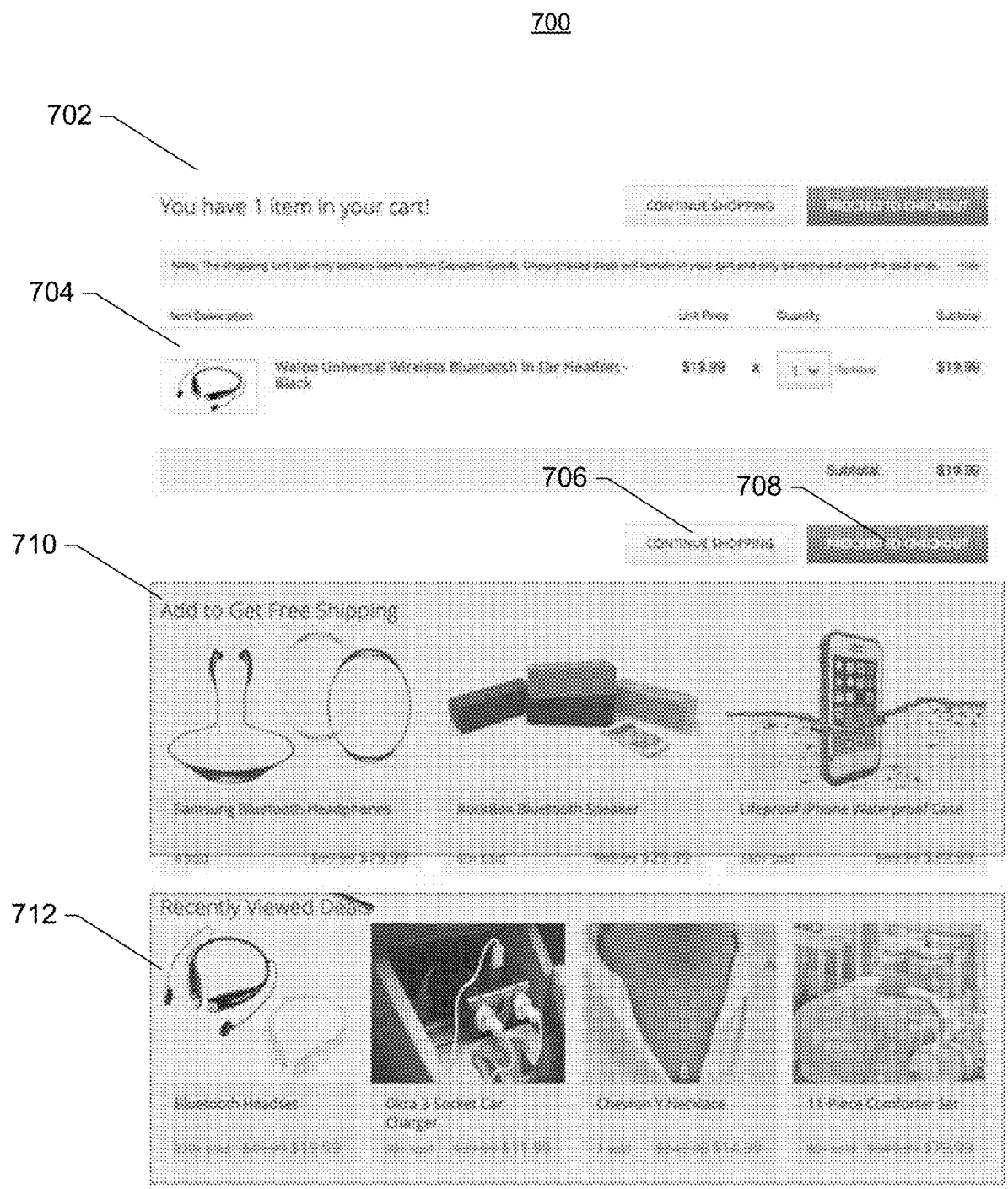

Having thus described some embodiments in general terms, reference will now be made to the accompanying drawings, which are not necessarily drawn to scale, and wherein:

FIG. 1 shows an example of a system in accordance with some embodiments;

FIG. 2 shows a schematic block diagram of example circuitry in accordance with some embodiments;

FIG. 3 shows a flow chart of an example of a method for generating widget analytic data in accordance with some embodiments;

FIG. 4 shows a flow chart of an example of a method for generating webpages in accordance with some embodiments;

FIGS. 5-7 show examples of consumer interfaces in accordance with some embodiments; and FIGS. 8-11 show examples of widget analytic data in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" or "promotion service" may include a service that is accessible via one or more computing devices and that is operable to provide promotion and/or marketing services on behalf of one or more providers that are offering one or more instruments that are redeemable for goods, services, experiences and/or the like. The promotion and marketing service may be provided by a promotion and marketing system. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The parameters of a promotion may be defined by promotion data. In some embodiments, the promotion data may define one or more redemption locations for a promotion, such as a merchant shop, restaurant, retail shop, etc.

Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), (e.g., consumer device) location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic or consumer segment information associated with each particular consumer, data indicating other content accessed by the consumer (e.g., browser cookie data), the time or date on which content was accessed, the frequency of impressions for particular content, associations between particular consumers or consumer demographics and particular impressions, the traffic source reference used to access the particular content, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, and/or presence-based wireless detection (e.g., where the consumer device is detected upon entering a communicable range of a detecting device, such as a beacon or merchant device located at a merchant shop/redemption location) such as personal area networks (PAN) (e.g., using WiFi, Bluetooth, etc.), infrared or other visual sensors, and/or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) text message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system within which embodiments of the present invention may operate. Consumers and merchants may access a promotion and marketing service from a promotion and marketing system 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing system 102 may comprise a server 104 and a database 106.

The server 104 may be embodied as a single computer or multiple computers. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic marketing communications based on the received electronic data (e.g., historical promotion data, electronic marketing data, clickstream data, widget analytic data, etc.). In some embodiments, the server 104 may be configured to generate electronic marketing communications including purchase funnel webpages configured to facilitate purchase of a promotion. For example, the funnel webpages may include at least a promotion webpage for selecting a promotion, and a checkout webpage for confirming purchase of the promotion. Furthermore, the webpages may be generated to include various widgets which provide various functionalities. As discussed in greater detail below, consumer device interaction with the widgets of the webpages may be recorded as clickstream data, and used to generate widget analytic data. In some embodiments, the server 104 may be further configured to generate webpages based at least in part of the widget analytic data. Although a single server 104 is shown, system 102 may include one or more servers 104. In some embodiments, the one or more servers 104 may include promotion service circuitry 210, as shown in FIG. 2.

Returning to FIG. 1, database 106 may be embodied as a data storage device such as a Network Attached Storage (NAS) device or devices, or as a separate database server or servers. The database 106 includes information accessed and stored by the server 104 to facilitate the operations of the promotion and marketing system 102. For example, the database 106 may include, without limitation, consumer device cookies used to track consumer device sessions, collected clickstream data based on consumer interactions with the webpages, user account credentials for system administrators, merchants, and consumers, promotion data indicating the products and promotions offered by the promotion and marketing service, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include wired or stationary devices such as desktop computers or workstations. Alternatively or additionally, the consumer devices 108A-108N may include mobile devices, such as laptop computers, smartphones, netbooks, tablet computers, wearable devices (e.g., electronic watches, wrist bands, glasses, etc.), and the like.

In embodiments where a consumer device 108 is a mobile device, such as a smart phone or tablet, the consumer device 108 may execute an "app" or "consumer application" to interact with the promotion and marketing system 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing system 102 may leverage the application framework offered by the mobile operating system to allow consumers to designate which information is provided to the app and which may then be provided to the promotion and marketing system 102. In some embodiments, consumers may "opt in" to provide particular data to the promotion and marketing system 102 in exchange for a benefit, such as improved relevancy of marketing communications offered to the user. In some embodiments, the consumer may be provided with privacy information and other terms and conditions related to the information provided to the promotion and marketing system 102 during installation or use of the app. Once the consumer provides access to a particular feature of the mobile device, information derived from that feature may be provided to the promotion and marketing system 102 to improve the quality of the consumer's interactions with the promotion and marketing service.

For example, the consumer may indicate that they wish to provide location information to the app from location services circuitry included in their mobile device. Providing this information to the promotion and marketing system 102 may enable the promotion and marketing system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing system 102. For example, the consumer may decide at a later point to disable the ability of the app to access the location services circuitry, thus limiting the access of the consumer's location information to the promotion and marketing system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing system 102 via a web browser. As yet another example, the consumer device 108 may include various hardware or firmware designed to interface with the promotion and marketing system 102 (e.g., where the consumer device 108 is a purpose-built device offered for the primary purpose of communicating with the promotion and marketing system 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing system 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing system 102 to enable the promotion and marketing system 102 to generate promotions or other marketing information to be provided to consumers.

Example Apparatus[es] For Implementing Various Embodiments

The server 104, database 106, consumer device 108 or merchant device 110 may be embodied by one or more computing systems or devices, such as apparatus 300 shown in FIG. 2. As illustrated in FIG. 2, the apparatus 200 may include a processor 202, a memory 204, an input/output circuitry 206, communications circuitry 208, and a promotion service circuitry 210. The apparatus 200 may be configured to execute the operations described herein. Although these components 202-210 are described with respect to functional limitations, it should be understood that the particular implementations necessarily include the use of particular hardware. It should also be understood that certain of these components 202-210 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The promotion service circuitry 210 may include hardware configured to generate and provide electronic marketing communications to consumer devices. In some embodiments, the promotion service circuitry 210 may be configured to provide the functionality discussed herein with respect to generating clickstream data and/or widget analytic data based on tracking consumer device interactions with webpages. In some embodiments, the promotion service circuitry 210 may be further configured to generate and/or provide the webpages to the consumer device 108.

Circuitry 210 may utilize processing circuitry, such as the processor 202, to perform these actions. However, it should also be appreciated that, in some embodiments, circuitry 210 may include a separate processor, specially configured field programmable gate array (FPGA), or application specific interface circuit (ASIC). Circuitry 210 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Webpage Creation and Consumer Interaction Tracking

FIG. 3 shows a flow chart of an example of a method 300 for generating widget analytic data, in accordance with some embodiments. Method 300 is discussed herein as being performed by system 100, and in particular one or more servers 104 in connection with a consumer device 108. In some embodiments, other suitably configured apparatuses, devices, and/or servers may also be used to perform method 300 (as well as the other methods discussed herein). For example, the consumer device 108 may be configured to perform some or all of the functionality or steps discussed herein with respect to the one or more servers 104.

Method 300 may begin at 302 and proceed to 304, where the one or more servers 104 (e.g., including promotion service circuitry 210) may be configured to establish a network connection with a consumer device 108. For example, the network connection may be established via network 112.

At 306, the one or more servers 104 may be configured to receive a request for access to a promotion webpage from the consumer device 108 via the network. The promotion webpage may be configured to provide a consumer interface for consumer device interaction with the promotion and marketing system. The promotion webpage may be accessed with a browser application installed and/or otherwise executing on the consumer device 108. In some embodiments, a consumer interface may be accessed with a consumer application (e.g., mobile application, for mobile consumer devices) installed on and/or otherwise executed by the processing circuitry of the consumer device. The promotion webpage may include an indication of a promotion, and user interfaces to facilitate purchase of the promotion.

In some embodiments, the one or more servers 104 may be further configured to determine a traffic sources associated with the request for access. For example, the request for access to the promotion webpage from the consumer device 108 may include a traffic source indicator. A traffic source, as used herein, refers to an advertising or impression type that refers the consumer device to request access to a promotion webpage (or other webpage). Some example traffic sources include email, direct, display, search engine optimization (SEO), search engine marketing (SEM), and affiliate. The email traffic source refers to email messages (e.g., including a URL reference or the like to the promotion webpage) generated by the promotion and marketing service, the direct traffic source refers to consumer direct access (e.g., through promotion browsing, searching, or entering the promotion webpage URL within the address bar of the web browser), the display traffic source refers to display or banner advertisements within other webpages (e.g., including other promotion webpages), the SEO traffic source refers to a search engine result returned based on ranking optimization for a search engine (e.g., a ranking optimized search result reference), the SEM traffic source refers to a search engine result returned based on paid listing to a search engine (e.g., a paid search result reference), and the affiliate traffic source refers to a merchant system or server (e.g., a merchant webpage with a reference to the promotion webpage). Each of the various traffic sources may be associated with different traffic source indicators.

At 308, the one or more servers 104 may be configured to determine whether a consumer device cookie has been received from the consumer device 108. The consumer device 108 may be configured to store a consumer device cookie to hold status information associated with a session. When the consumer device 108 generates the request for access to the promotion webpage, the consumer device 108 may be configured to identify a stored consumer device cookie associated with the promotion webpage (e.g., domain, path, etc.) and to send the consumer device cookie to the one or more servers 104. Alternatively, a consumer device cookie may be omitted from the request when unavailable at the consumer device 108.

In response to determining the no consumer device cookie has been received from the consumer device 108, method 300 may proceed to 310, where the one or more servers 104 may be configured to generate a consumer device cookie. For example, the consumer device cookie may include one or more attributes. The attributes may be represented as a string of name-value pairs, such as: consumer identifier=XXXXX, where XXXX represents a unique identifier of a consumer account and/or consumer device 108. Other attributes may include domain and path attributes that define the webpage(s) associated with the consumer device cookie. In some embodiments, such as when the consumer device cookie is a session cookie the attributes may further include session identifier attribute that represents a unique identifier for the current session.

At 312, the one or more servers 104 may be configured to associate the consumer device cookie with a consumer account. The consumer account may be a user account that is managed by the promotion and marketing system 102. The system 102 may receive electronic marketing information from various networked devices (e.g., clickstream data and discretionary data from consumer devices, transaction data from merchant devices that interact with consumer devices, etc.) in the course of providing the promotion and marketing service, and may use the electronic marketing information to build a profile. Based on the profile and promotion parameters, candidate promotions may then be scored and/or ranked by a universal relevance service. In some embodiments, the notification data associated with the highest ranking candidate promotion and/or item may be selected for inclusion within an electronic marketing communication. The electronic marketing communication may take the form of various traffic sources, such as email. Additional details regarding a universal relevance service, applicable in some embodiments, are discussed in U.S. Provisional Patent Application No. 62/140,957, titled "Universal Relevance Service Framework," filed Mar. 31, 2015, which is incorporated by reference herein in its entirety.

At 314, the one or more servers 104 may be configured to provide the consumer device cookie to the consumer device 108. The consumer device cookie may be sent via the network 112, and may be sent back to the one or more servers 104 when the consumer device 108 requests access to the promotion webpage, or some other webpage, hosted by the promotion and marketing system 102 as discussed above at 306. Method 300 may then proceed to 316.

Returning to 308, in response to determining that the consumer device cookie was received from the consumer device 108, method 300 may also proceed to 316, where the one or more servers 104 may be configured to generate the promotion webpage including widgets. Each webpage provided by the promotion and marketing service may include a plurality of widgets, and consumer interactions with the widgets may be tracked as clickstream data. The widgets may be configured to provide different features or functionalities.

FIG. 5 shows an example of a consumer interface 500 in accordance with some embodiments. The consumer interface 500 may be provided to the consumer device 108 for consumer device interaction with the promotion and marketing service. For example, the consumer device interactions with one or more webpages that are provided by the promotion and marketing service to the consumer interface may be used to generate clickstream data, widget analytic data, etc.

The consumer interface 500 may include a promotion webpage 502 (or "promotion page") including an indication of a promotion. Here, the promotion is for a Universal Wireless Bluetooth Necklace in Ear Headset. The promotion webpage 502 may include promotion image 504, promotion text 506, and buy button 508. The promotion image 504 may include an image associated with the promotion and the promotion text 506 may include a write up or description of the promotion. The promotion image 504 and the promotion text 506 of the promotion may be stored as promotion data in the one or more database 106 of the promotion and marketing system 102. Similarly, promotion data associated with other available or candidate promotions may also be stored in the one or more database 106, and may be selected for presentation within a promotion webpage 502, or the like. The buy button 508 may provide a reference or link for entering an electronic purchase funnel for purchase of the promotion. In some embodiments, the promotion image 504, the promotion text 506, and/or the buy button 508 may each be widgets of the promotion webpage 502 (or a "promotion image widget" "promotion text widget," and "buy button widget," respectively).

In addition to the widgets 504-508 directed to presenting and/or facilitating purchase of the promotion, the promotion webpage 502 may further include one or more additional widgets. For example, the promotion webpage 502 may include an ask a question (AAQ) widget 510 and a customers also bought (CAB) widget 512. The AAQ widget 510 may provide a link or reference to a forum, live help, etc. for posting questions and receiving answers associated with the promotion. The CAB widget 512 may include an indication of one or more recommended promotions that are selected based the promotion shown in the promotion webpage 502. For example, the recommended promotions may be selected based on similarities (e.g., promotion parameters) to the promotion, or may be selected based on historical transaction data showing a nexus between purchases of the promotion and the one or more recommended promotions, or a tendency for consumers who purchase the promotion to also purchase the one or more recommended promotions. Each recommended promotion within the CAB widget 512 may be associated with a link or reference. Upon selection of a promotion, another promotion webpage associated with the selected promotion may be presented to the consumer interface 500.

At 318, the one or more servers 108 may be configured to generate clickstream data based on tracking widget views within the promotion webpage. For example, the widgets within the promotion webpage may be tagged as being widgets of interest, or locations of interest, within the promotion webpage. In some embodiments, the promotion webpage may further include Javascript or other program instructions that configure the web browser of the consumer device 108 to monitor the scrolling of the promotion webpage and mark widgets as being viewed when the widget is presented on the screen of the consumer device. In some embodiments, more complex scrolling behaviors may be monitored. For example, a widget may not be considered viewed by simply scrolling past the widget, but instead require that a widget be in view within the screen for a predefined time period (e.g., a few seconds). The clickstream data indicating the scrolling behavior, and viewed widgets, may be sent by the consumer device 108 to the one or more servers 104.

FIG. 6 shows an example of a consumer interface 500 in accordance with some embodiments. The size of the promotion webpage 502 may be larger than the size of the screen 602 of the consumer device 108. Here, the one or more servers 104 may scale or otherwise generate the promotion webpage 502 such that the entire promotion webpage 502 can be viewed based on scrolling along a single dimension. For example, the promotion webpage 502 may be configured to match the screen 602 along the horizontal dimension and provide scrolling along the vertical dimension A.

The widgets within a webpage may be slotted or positioned in a predefined order. With reference to promotion webpage 502, the promotion image widget 504 may be slotted in a first (e.g., top) position, the promotion text widget 506 may be slotted in a second (e.g., second from the top) position, the AAQ widget 510 may be slotted in a third (e.g., third from the top) position, and the CAB widget 512 may be slotted in a fourth (e.g., bottom) position. Here, the relative positions are ordered based on a home or default position (e.g., at the top as shown in FIG. 6) and the vertical scrolling dimension A, with the higher positioned widgets being visible within the consumer interface 500 with no scrolling or less scrolling (e.g., the promotion image widget 504 and the promotion text widget 506), and the lower positioned widgets being visible within the consumer interface 500 with more scrolling (e.g., the AAQ widget 510 and the CAB widget 512).

In some embodiments, widgets may be determined as viewed based on web browser scroll depth. The scroll depth within a webpage may be represented as a percent. For example, the home or default position as shown by screen 602 may be 0% scroll depth, representing no scrolling. In another example, the bottom position as shown by screen 604 may be 100% scroll depth, representing scrolling to the end of the web page along the scrolling dimension. The locations of the widget within the web page (e.g., along the scrolling dimension) may then be defined with respect to the scroll depths. For example, the as AAQ widget 510 may be defined as being located between 50% to 100% scroll depths, meaning that the AAQ widget 510 may be determined as being viewed when the promotion webpage has been scrolled between the 50% to 100% scroll depths. In some embodiments, different locations, segments, or scroll depths on a webpage can be determined to have higher value based on users scrolling to that location and viewing and/or interacting with the content at a higher frequency.

In some embodiments, the clickstream data may monitor interactions with widgets in addition or alternative to views. For example, consumer interaction with the widgets via consumer device input (e.g., mouse clicks, touchscreen inputs, etc.) may also be recorded and provided to the one or more servers 104.

In some embodiments, the one or more servers 104 may be further configured to generate clickstream data indicating the traffic source, promotion category of the displayed promotion, and/or a consumer segment associated with the consumer. For example, the traffic source for access to the promotion webpage, the promotion category associated with the promotion (e.g., electronics), and a consumer segment (e.g., a profile parameter, demographic, or consumer characteristic) may be determined as click stream data.

At 320, the one or more servers 104 may be configured to associate the clickstream data with the consumer device cookie. For example, the clickstream data may be stored in the one or more databases 106 along with the consumer device cookie, and/or the cookie data of the consumer device cookie. For example, the clickstream data may be stored in association with the consumer identifier attribute of the consumer device cookie. Additionally or alternatively, the clickstream data may be associated with the session identifier attribute. As such, the clickstream data may be associated with the consumer account and the session created upon receiving the consumer device cookie.

At 322, the one or more servers 104 may be configured to determine whether the buy button of the promotion webpage has been selected via consumer device input. For example, the consumer may select the buy button 508 within the promotion webpage 502 to purchase the promotion for the headset. The consumer device input may be generated via an input device of the consumer device 108, such as a touchscreen or mouse click. In some embodiments, in response to selection of the buy button 502, the consumer device 108 may be configured to generate and send a request for access to the checkout webpage referenced by the buy button 502. The consumer device 108 may be further configured to send the consumer device cookie with the request. In some embodiments, the consumer device cookie may accompany each webpage request to provide a persistent session across webpage traversals.

In response to determining that the buy button has not been selected, method 300 may return to 318, where the one or more servers 104 may continue to generate clickstream data on tracking widget views within the promotion webpage. Furthermore, the one or more servers 104 may wait for consumer device selection of the buy button. Alternatively to pressing the buy button, the consumer may close the browsing session, such as by closing the browser, taking a reference to a third party website, entering a third party website URL within the browser address bar, etc. In some embodiments, the closing of the browsing session without visiting a subsequent webpage may be determined as a bounce. The bounce may be recorded as clickstream data and associated with the consumer identifier and/or session identifier of the consumer device cookie.

Returning to 322, in response to determining that the buy button has been selected, method 300, where the one or more servers may be configured to associate the promotion with the consumer device cookie. Here, the consumer device cookie (or one or more of its attributes such as the consumer identifier or session identifier) may be used to associate one or more selected promotions via the buy buttons with a virtual shopping cart. In some embodiments, the one or more servers 104 may be configured to update the consumer device cookie with each promotion (e.g., based on adding promotion identifier attributes), and send the consumer device cookie to the consumer device 108 via the network 112. The consumer device cookie may be stored in a memory of the consumer device 108, and may be passed back to the one or more servers 104 (e.g., at 308). The one or more servers may then be configured to use the received promotion identifiers to populate the shopping cart with items upon subsequent visits to the webpages of the promotion and marketing service. Advantageously, the added promotions can persist through multiple sessions via this sharing and updating of the consumer device cookie.

In some embodiments, the consumer device cookie may further include a time valid attribute that defines when the cookie and/or the promotion identifiers stored therein are no longer to be used. Here, the consumer device 108 may check the time valid attribute prior to ensure the consumer device cookie has not expired prior to sending the consumer device cookie to the one or more servers 104 with the request for access to the promotion webpage.

In some embodiments, the one or more servers 104 may be configured to generate clickstream data indicating selection of the buy button. The clickstream data may be associated with the consumer identifier and/or session identifier of the consumer device cookie as discussed above. In some embodiments, the one or more servers 104 may be further configured to associate a webpage identifier of the promotion webpage with the consumer identifier and/or session identifier of the consumer device cookie as clickstream data. Thus the scroll behavior, widget views, bounces, promotion purchases, clicks, or other consumer device interactions with the promotion webpage may be associated with the promotion webpage.

At 326, the one or more servers 104 may be configured to generate a checkout webpage including widgets. The checkout webpage may also include one or more widgets, which may be the same or different from widgets of the promotion webpage.

FIG. 7 shows an example of a consumer interface 700, in accordance with some embodiments. The consumer interface 700 may include a checkout webpage 702 provided to the consumer device 108 for purchase confirmation of selected promotions, such as in response to receiving consumer device input indicating selection of a buy button 508 within a promotion webpage 502. The one or more servers 104 may be configured to associate each selection of a buy button 508, or the like, within a session with a shopping cart. The checkout webpage 702 may include a checkout display including selected item(s) 704 that have been added to the shopping cart. Items may be added or removed from the shopping cart, such as based on selection of continue shopping button 706. The items within the shopping cart may be purchased based on selection of checkout button 708.

The checkout webpage 702 may also include widgets, such as free shipping (FS) widget 710 and recently viewed deals (RVD) widget 712. The FS widget 710 may include one or more promotions that if added to the shopping chart with the selected promotions 704 would result in the consumer being rewarded with no additional cost for shipping the purchased items. The promotions within the FS widget 710 may be selected using any suitable technique, such as relevance to the consumer, one or more selected promotions 704, etc. In some embodiments, the promotions within the FS widget 710 may be selected based on a cost threshold and/or a weight threshold for the items of the promotion. For example, a candidate promotion may be selected based on the accepted value (e.g., purchase price) of the candidate promotion combined with the accepted values of one or more selected promotions 704 exceeds a predefined dollar value. Additionally or alternatively, a candidate promotion may be selected based on the weight of the candidate promotion combined with the weights of one or more selected promotions 704 not exceeding a predefined weight value.

The RVD widget 712 may be configured to present promotions that have been accessed or viewed by the consumer. For example, when the consumer device accesses a promotion webpage 500 of a promotion, the one or more servers 104 may be configured to log the access to the promotion. The logged promotions, such as a predetermined number of most recently viewed promotions, may then be provided to the RVD widget 712.

The discussion above with respect to the widgets of the promotion webpage 500 may also be applicable to the widgets of the checkout webpage 702. For example, the widgets 710 and 712 may be slotted or positioned in a view order, with the FS widget 710 being given a higher priority than the RVD widget 712.

In some embodiments, depth or "browsing depth" for widgets can be determined across a multiple webpages. For example, in a purchase funnel, the promotion webpage 502 is presented first with a buy button 508, which provides a reference to the subsequent checkout webpage 702. Thus the widgets within the promotion webpage 502 may be ordered and also associated with a smaller depth than the ordered widgets of the checkout webpage 704. Similarly, widgets may populate the slots or positions available within each webpage based on their sequence or ranking across the multiple webpages.

The widgets shown within the promotion webpage 502 and the checkout webpage 702 may not necessarily be arranged as shown. For example, the CAB widget 512 may be included within the promotion webpage 502. In another example, the RVD widget 712 may be included within the checkout webpage 702.

At 328, the one or more servers 104 may be configured to generate (e.g., second) clickstream data based on tracking widget views within the checkout webpage. At 330, the one or more servers 104 may be configured to associate the clickstream data with the consumer device cookie. The discussion at 318 and 320 may be applicable at 328 and 330. In some embodiments, the clickstream data may be associated with the consumer identifier attribute and/or the session identifier attribute.

At 332, the one or more servers 104 may be configured to determine whether the checkout button within the checkout display has been selected. For example, the consumer may select the buy button 508 within the promotion webpage 502 to purchase the promotion for the headset. The consumer device input may be generated via the input device of the consumer device 108, such as a touchscreen or mouse click.

In response to determining that the checkout button has not been selected, method 300 may return to 328, where the one or more servers 104 may be configured to continue generating clickstream data based on tracking widget views within the checkout webpage. Alternatively, the consumer may close the browsing session, such as by closing the browser, taking a reference to a third party website, entering a third party website URL within the browser address bar, etc.

Returning to 332, in response to determining that the checkout button has been selected, method 300 may proceed to 334, where the one or more servers 104 may be configured to facilitate purchase of the selected promotions (e.g., within the shopping cart) associated with the consumer device cookie. For example, the consumer interface may be directed to a payment webpage configured to receive payment data (e.g., credit card number, bank account number, etc.). In another example, the payment may use stored payment data associated with the consumer account. Furthermore, a redemption instrument (e.g., barcode) may be sent to the consumer device 108 to facilitate promotion redemption at merchant locations.

At 336, the one or more servers 104 may be configured to perform steps 304-334 for (e.g., multiple) consumer devices to aggregate clickstream data associated with consumer device cookies. For example, each consumer device may be associated with a unique consumer device cookie as discussed above, and stored in the one or more databases 106. The clickstream data generation discussed above may be performed for each of the consumer devices, and associated with the respective consumer device cookies within the one or more databases 106. In some embodiments, an offline batch processor or the like of the promotion and marketing system 102 may be configured to perform the data aggregation based on retrieving the clickstream data stored in the one or more databases 106.

At 338, the one or more servers 104 (or a batch processor) may be configured to generate widget analytic data based on the aggregated clickstream data associated with the consumer device cookies. Widget analytic data, as used herein, refers to data indicating widget performance in terms of various criteria (e.g., promotion purchases, views, browsing depth, etc.).

Figure 8:
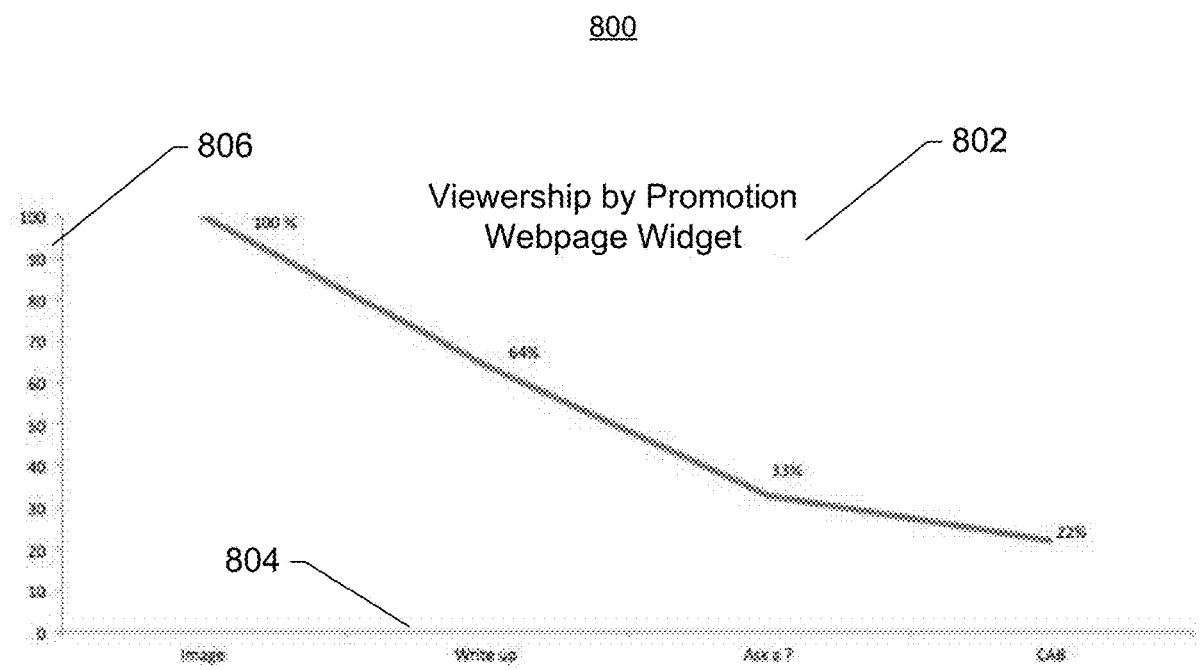

In some embodiments, the widget analytic data may indicate views per widget on a webpage. FIG. 8 shows an example of widget analytic data 800, in accordance with some embodiments. The widget analytic data 800 is represented in a line chart 802, wherein the widgets of the promotion webpage 502 are plotted along the X axis 804 and widget viewership as a percentage of total promotion webpage accesses are plotted along the Y axis 806. In particular, the promotion image widget 504, the promotion text widget 506, the AAQ widget 510, and the CAB widget 512 are arranged in order according to browsing or scrolling depth as discussed above. As shown in line chart 902, about 70% of webpage viewers close the webpage prior to or upon viewing the promotion text widget 506.

In some embodiments, the widget analytic data may be further filtered or analyzed based on one or more of the traffic source, promotion category, and/or a consumer segment. For example, clickstream data associated with the email traffic source may be treated separately from clickstream data associated with the direct traffic sources, and separate widget analytic data may be generated to determine differences in widget viewership among the different traffic sources. The widget analytic data may then be used by the promotion and marketing system 102 to determine widget viewership trends or difference among the different traffic sources. For example, the email traffic source typically results in more views of the promotion webpage (e.g., and thus more views of greater depth widgets), but have fewer promotion webpage views per session and lower conversion rates (e.g., purchases per session, or webpage view). The direct traffic source typically results in less webpage engagement (e.g., and thus less of greater depth widgets) prior to purchase, but more sessions on average and higher conversion rates. Here, the inventors have appreciated a correlation between lower widget engagement and higher conversion rates. In another example, the one or more servers 104 may analyze webpage views prior to purchase by traffic source and consumer segment to better understand the low page engagement and high conversion rate phenomenon. For example, for webpages visited from the email traffic source, fewer widgets may be presented based on the programmatically determined correlation between lower widget engagement and higher conversion rates.

In another example, the widget analytic data may be further filtered or analyzed based on one or more of the traffic source, promotion category, and/or a consumer segment. Analysis of behavior collected from one day of clickstream data generation showed interesting results in the clustering of data. In particular, different consumer segments had differing levels of widget views or webpage engagement based on the traffic source and/or promotion purchase. Since each session is a data point, consumer device cookies with multiple session in a day might fall in different clusters.

In some embodiments, clickstream data and/or widget analytic data may be analyzed over a period of time, such as two weeks. For example, the data may be aggregated at consumer device cookie/day level, which all consumer device cookies associated with at least one promotion webpage view as included. The various forms of clickstream data that may be used or determined may include traffic source, average promotion webpage views (pv), average items webpage pv, average items gallery (e.g., a webpage with multiple displayed items including links to item webpages) pv, local gallery (e.g., a webpage with multiple displayed local promotions including links to local promotion webpages) pv, average getaway gallery (e.g., a webpage with multiple displayed getaway promotions including links to getaway promotion webpages) pv, aberage has purchase (e.g., session includes a promotion purchase), average is a bounce (e.g., session that has only and only one promotion webpage pv), average number of clicks (e.g., number of clicks within a session), average number of buy button clicks (e.g., number of clicks within a session, added to the shopping cart, etc.), average has search (e.g., consumer used a search interface within a session), etc.

Figure 9:
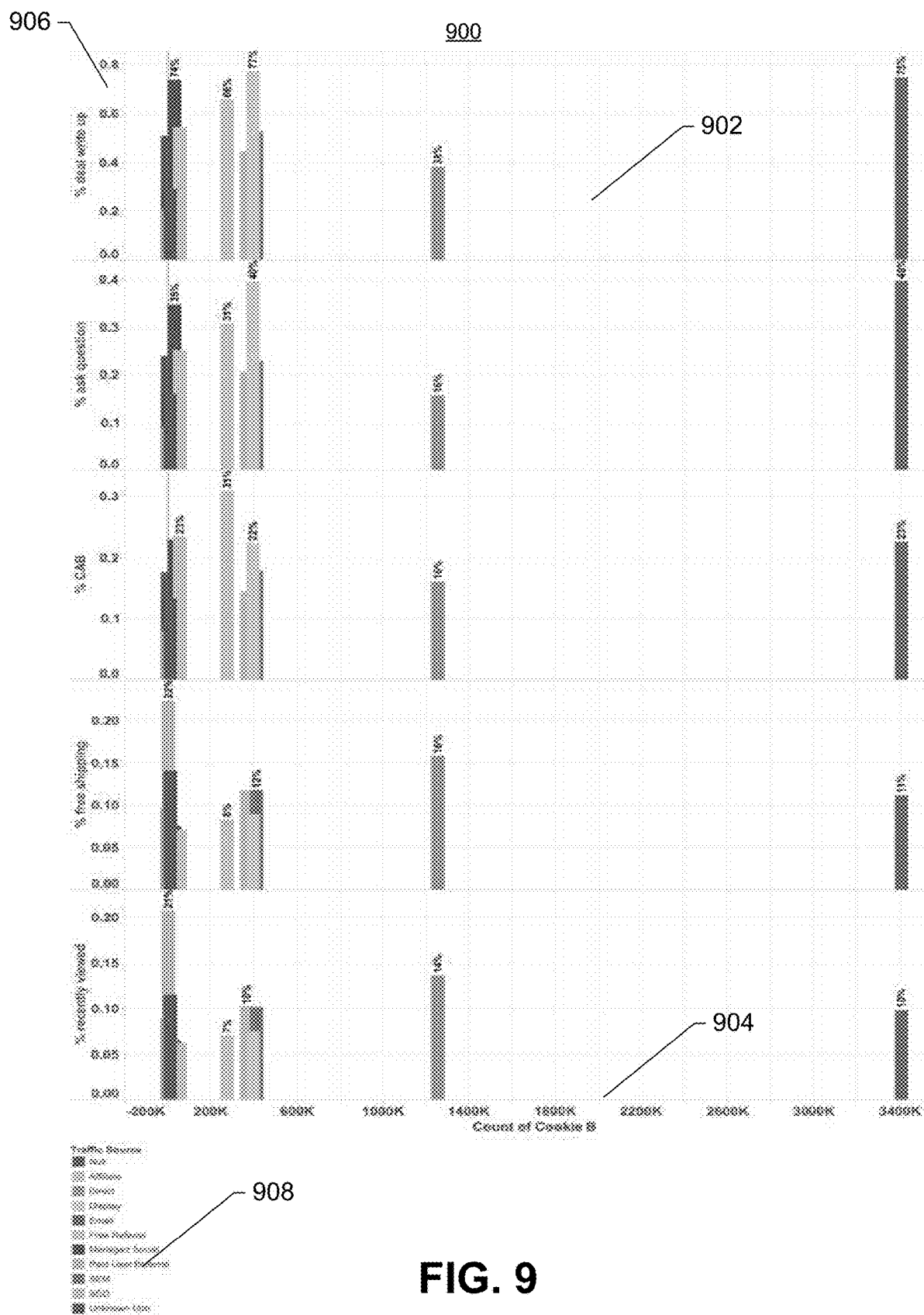

In some embodiments, the widget analytic data may be collected to understand how consumers scroll down and read the webpages, what widgets they look at, and if there is a difference between the consumers who look/don't look at the widgets. In some embodiments and for a consumer device cookie, each widget may be considered as seen when the consumer has looked at that widget in 50% or more of the promotion webpages (e.g., visited within a session). FIG. 9 shows an example of widget analytic data 900, in accordance with some embodiments. The widget analytic data 900 is represented in a line chart 902, wherein the number of consumer device cookies collected within a predetermined period (e.g., 2 weeks) is plotted along the X axis 904 and widget viewership as a percentage of total promotion webpage accesses are plotted along the Y axis 906 for different traffic sources as shown by the bars 908. As such, the one or more servers 104 may be configured to determine the ability of various traffic sources drive widget viewership or webpage engagement.

Figure 10:
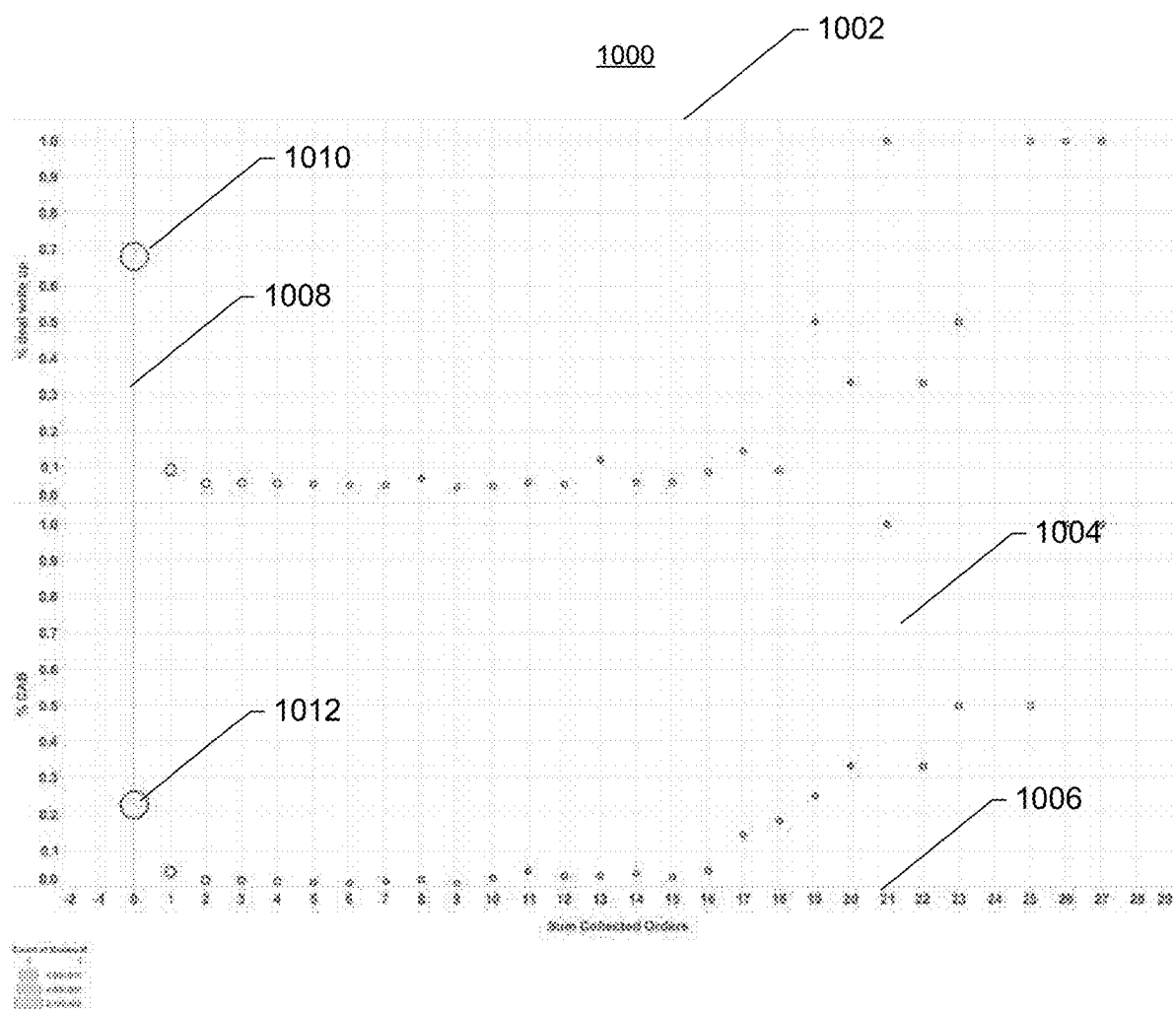

In some embodiments, clickstream data and/or widget analytic data may be analyzed to determine the widgets seen for consumers with different numbers of promotions purchased. FIG. 10 shows an example of widget analytic data 1000, in accordance with some embodiments. The widget analytic data 1000 is represented in a line chart 1002 and a line chart 1004. In line chart 1002, the number of purchases or collected orders within a predetermined period (e.g., 2 weeks) by consumers is plotted along the X axis 1004 and promotion text widget viewership as a percentage of total promotion webpage accesses are plotted along the Y axis 1006. In line chart 1004, the number of purchases or collected orders within a predetermined period (e.g., 2 weeks) by consumers is plotted along the X axis 1004 and CAB widget viewership as a percentage of total promotion webpage accesses are plotted along the Y axis 1006. As shown by average values 1010 and 1012 for the promotion text widget and the CAB widget, respectively, consumers who purchase appear to scroll down less than consumers without purchase.

Figure 11:
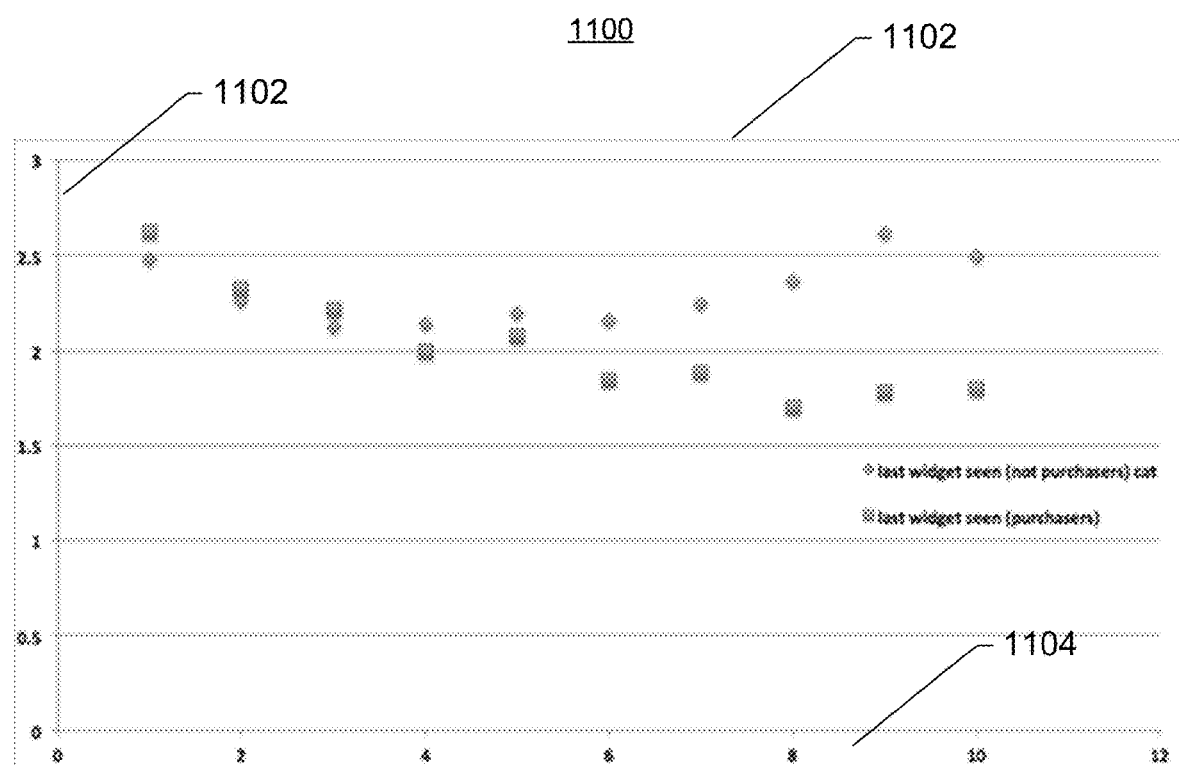

In some embodiments, clickstream data and/or widget analytic data may be analyzed to determine the widgets seen for consumers who purchase a promotion versus consumers who do not purchase a promotion. FIG. 11 shows an example of widget analytic data 1100, in accordance with some embodiments. The widget analytic data 1100 is represented in a line chart 110, wherein the number of times consumers viewed a promotion webpage within a predetermined period (e.g., 2 weeks) is plotted along the X axis 1104 and browsing depth (e.g., in terms of last widget seen on average) is plotted along the Y axis 1106. The various widgets of the webpages may be located at different browsing depths as discussed above. Here, a Y axis 1106 value of 1 is associated with the promotion image widget, 2 is associated with the promotion text widget, 3 is associated with the AAQ widget, 4 is associated with the CAB widget, and 5 is associated with the FS widget. Analytic data 1100 indicates that consumers who purchase make purchases tend to not browse as deeply as consumers who fail to make purchases. This may be caused by the fact that consumers making purchases may have made the decision when they visit the webpage (e.g., so no need for scrolling down below the buy button).

It is appreciated that the types of clickstream data and/or widget analytic data that may be generated is not limited to the examples shown. For example, clickstream data may be collected over different periods of time and aggregated, and may be filtered based on various criteria (e.g., traffic source, consumer segment, etc.). Method 300 may then proceed to 340 and end.

FIG. 4 shows a flow chart of an example of a method 400 for generating webpages, in accordance with some embodiments. Method 400 can be performed in combination with method 300, such as at 316 and 326 to generate a promotion webpage and checkout webpage based on the consumer device cookie. Furthermore, the webpages may be generated based on clickstream data and/or widget analytic data generated in accordance with method 300, or using some other suitable technique.

Method 400 may begin at 402 and proceed to 404, where the one or more servers 104 may be configured to receive a consumer device cookie. The consumer device cookie may be received with a request for access to a webpage. As such, the discussion at 306 and 308 of method 300 may be applicable at 404.

At 406, the one or more servers 104 may be configured to associate selected promotions with a shopping cart. The selected promotions may be determined based on the received consumer device cookie, which may include promotion identifiers as discussed above. Alternatively, the one or more servers 104 may log buy button clicks and associate the selected promotions with the shopping cart based on logging receipt of the consumer device cookie in connection with the buy button selection. While the consumer device cookie and/or session remains active, the selected promotions may be persisted based on retrieving the selected promotions using the consumer device cookie as a reference or search term.

At 412, the one or more servers 104 may be configured to determine purchase funnel webpages including a promotion webpage and a checkout webpage, the purchase funnel webpages including widget slots distributed across the promotion webpage and the checkout webpage. As discussed above, the promotion webpage 502 may be presented first with a buy button 508, which provides a reference to the subsequent checkout webpage 702. Thus both the promotion webpage 502 and the checkout webpage 702 may be portions of the purchase funnel webpages that the consumer navigates to complete a purchase of the promotion. With reference to FIG. 5, for example, promotion webpage 502 may include four widget slots. Here, the widget slots have been respectively populated with widgets 504, 506, 510 and 512. Similarly, checkout webpage 702 shown in FIG. 7 includes two widget slots, which have been respectively populated by widgets 710 and 712. In various embodiments, the distribution of widget slots, as number of widget slots within each webpage, etc. may vary, such as based on one or more predefined templates. In some embodiments, different templates may be used based on the consumer device type. For example, mobile consumer devices may use templates that designed for smaller screen sizes than desktop consumer devices. Here, the number of widgets on a webpage may be reduced and/or the arrangement of the widgets within a webpage may be modified.

At 414, the one or more servers 104 may be configured to determine a priority of the widget slots across the purchase funnel webpages. In general, slots of lower browsing or scroll depth may be associated with a higher priority because such widget slots are visible or more readily visible upon the webpage loading in the consumer interface. For example, widgets slots within each webpage may be ordered from top to bottom (e.g., for a vertical scroll webpage), and then widget slots of the first promotion webpage may be ordered ahead of the ordered widget slots of the subsequent checkout webpage. For example, the seven widget slots across the promotion webpage 502 and the checkout webpage 702 may be ordered from first to seventh. In various embodiments, one or more additional webpages including widget slots may be added to the purchase funnel webpages, with the widget slots ordered accordingly. The locations or positions on the webpage where widget slots are located may be determined to have higher value based on how often users scroll to that location, view and/or interact with widgets at the location, etc.

At 416, the one or more servers 104 may be configured to determine a widget ranking of widgets based on widget analytic data. The widget analytic data may be generated as discussed above in method 300. For example, widgets may be ranked based on their likelihood to result in a purchase, or to keep a consumer engaged for a longer period of time, likelihood in resulting in a click or selection within the widget, etc. Thus the widgets within the promotion webpage 502 may be ordered and also associated with a smaller depth than the ordered widgets of the checkout webpage 704.

At 418, the one or more servers 104 may be configured to populate the widget slots based on the widget ranking. The widgets may populate the slots or positions available within each webpage based on their sequence or ranking across the multiple webpages, as shown in promotion webpage 502 and/or checkout webpage 702.

At 420, the one or more servers 104 may be configured to tag the widgets for tracking. The tracking may include view tracking, click tracking, etc. In some embodiments, the one or more servers 104 may be configured to define screen portions of the webpage associated with each widget, as shown by the boxes overlaying the widgets 506, 510 and 512 in the promotion webpage 502. Thus clickstream data may be generated when the tagged portions of the webpage are viewed within the consumer interface as discussed herein. In some embodiments, the widget tags may be defined with respect to scroll depths, and thus measured scrolls depths of the browser may be used to determine when widgets have been viewed.

At 422, the one or more servers 104 may be configured to provide the purchase funnel webpages to the consumer device 108. For example, the promotion webpage and the checkout webpage may be provided to the consumer device as discussed above in method 300. Method 400 may then proceed to 424 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising one or more servers each comprising at least one memory and at least one processor, the at least one memory storing instructions that, when executed by the at least one processor, cause the system to:
    establish a wireless connection with a consumer device via a network; receive a first request for access to a first promotion webpage from the consumer device and via the network, wherein the first request includes a consumer device cookie and the first promotion webpage includes an indication of a promotion, wherein the promotion is offered for purchase such that a purchase of the promotion results in issuance, by the system, of an instrument that may be used toward at least a portion of one of a purchase, acquisition, procurement, or consumption of one of goods, services, or experiences;
    in response to receiving the first request for access to the first promotion webpage, generate the first promotion webpage including widgets;
    enable access, via the network, by the consumer device to the first promotion webpage:
    generate clickstream data based on tracking widget views of the widgets within the first promotion webpage by tagging the widgets within the first promotion webpage, transmitting instructions to the consumer device that configure the consumer device to monitor scrolling of the first promotion webpage and determine widgets as being viewed only when the widgets are presented on a display of the consumer device for at least a predefined period of time; and receiving second clickstream data from the consumer device indicating those widgets determined to have been viewed;

associate the consumer device cookie with a consumer account, and associate the clickstream data with the consumer device cookie;

generate aggregate clickstream data based on combining the clickstream data associated with the consumer device cookie with clickstream data associated with one or more other consumer device cookies;

generate widget analytic data based on the aggregated clickstream data;

receive a second request, from the consumer device and via the network, for access to a second promotion webpage, the second request occurring at a point in time subsequent to the first request and being based on electronic interactions by the consumer device with the first promotion webpage;

in response to receiving the second request, generate the second promotion webpage based on the widget analytic data for widgets within the first promotion webpage, the second promotion webpage comprising widget slots and an indication of a subset of promotions selected from a plurality of candidate promotions, each promotion of the subset of promotions selected for inclusion in the second promotion webpage based on a relevance score calculated for the promotion specific to the consumer account and based on a profile of the consumer account and promotion parameters, the profile comprising transaction data from merchant devices that interact with the consumer device, the subset of promotions having the highest relative relevance scores compared to other candidate promotions excluded from the subset of promotions, each widget slot associated with a promotion of the subset of promotions, and the promotion parameters comprising data specific to one of a purchase, acquisition, procurement, or consumption of one of goods, services, or experiences;

determine a widget ranking of the widgets based on the widget analytic data; and transmit, to the consumer device and via the network, the second promotion webpage comprising widget slots populated with the widgets based on the widget ranking, the transmitting comprising enabling access, via the network, by the consumer device to the second promotion webpage, wherein the second promotion webpage is renderable for display by the consumer device, and wherein the widgets are arranged within the second promotion webpage in a predefined order.

2. The system of claim 1, wherein the at least one memory further stores instructions that, when executed by the at least one processor, cause the system to generate the clickstream data based on tracking widget views of the widgets by:

associating the widgets with scrolling depths of the first promotion webpage;

transmitting instructions to the consumer device that configure the consumer device to monitor scrolling of the first promotion webpage and determine widgets as being viewed when the widgets are presented on the display of the consumer device; and receiving second clickstream data from the consumer device indicating scrolling behavior within the first promotion webpage.

3. The system of claim 1, wherein the at least one memory further stores instructions that, when executed by the at least one processor, cause the system to:

determine a traffic source associated with the request for access to the first promotion webpage;

associate the clickstream data with the traffic source; and generate the widget analytic data based on the traffic source associated with the clickstream data.

4. The system of claim 1, wherein:

the first promotion webpage includes a buy button configured to initiate purchase of the promotion; and the at least one memory further stores instructions that, when executed by the at least one processor, cause the system to, in response to receiving consumer device input indicating selection of the buy button, associate the promotion with the consumer device cookie.

5. The system of claim 4, wherein the at least one memory further stores instructions that, when executed by the at least one processor, cause the system to, in response to receiving consumer device input indicating selection of the buy button:

generate a checkout webpage including second widgets;

generate second clickstream data based on tracking widget views of the second widgets within the checkout webpage; and associate the second clickstream data with the consumer device cookie;

generate second aggregate clickstream data based on combining the aggregate clickstream data with the second clickstream data and second clickstream data associated with the one or more other consumer device cookies; and generate second widget analytic data based on the second aggregated clickstream data.

6. The system of claim 4, wherein:

the checkout webpage includes a checkout button; and the at least one memory further stores instructions that, when executed by the at least one processor, cause the system to, in response to receiving consumer device input indicating selection of the checkout button, facilitate purchase of one or more promotions associated with the consumer device cookie.

7. The system of claim 1, wherein:

the consumer device cookie includes at least one of a consumer identifier or a session identifier; and the at least one memory further stores instructions that, when executed by the at least one processor, cause the system to associate the clickstream data with the consumer device cookie includes the one or more servers being configured to associate the clickstream data with the at least one of the consumer identifier or a session identifier.

8. The system of claim 1, wherein the at least one memory further stores instructions that, when executed by the at least one processor, cause the system to generate the widget analytic data based on the aggregated clickstream data by determining viewership per widget.

9. The system of claim 1, wherein the at least one memory further stores instructions that, when executed by the at least one processor, cause the system to generate the widget analytic data based on the aggregated clickstream data by determining widget viewership for different traffic sources.

10. The system of claim 1, wherein the at least one memory further stores instructions that, when executed by the at least one processor, cause the system to generate the widget analytic data based on the aggregated clickstream data by determining widget viewership for different consumer segments.

11. The system of claim 1, wherein the at least one memory further stores instructions that, when executed by the at least one processor, cause the system to generate the widget analytic data based on the aggregated clickstream data by determining widget viewership for purchasers and non-purchasers of the promotion.

12. The system of claim 1, wherein the at least one memory further stores instructions that, when executed by the at least one processor, cause the system to:
determine purchase funnel webpages including the first promotion webpage and a checkout webpage, each purchase funnel webpage including widget slots; determine a priority of the widget slots across the purchase funnel webpages; determine a widget ranking of the widgets based on the widget analytic data; and populate the widget slots based on the widget ranking.

13. The system of claim 1, wherein the at least one memory further stores instructions that, when executed by the at least one processor, cause the system to:
generate the consumer device cookie; and
provide the consumer device cookie to the consumer device via the network.

14. A method, comprising, by one or more servers: establishing a wireless connection with a consumer device via a network; receiving a first request for access to a first promotion webpage from the consumer device and via the network, wherein the first request includes a consumer device cookie and the first promotion webpage includes an indication of a promotion;
in response to receiving the first request for access to the first promotion webpage, generating the first promotion webpage including widgets;
enable access, via the network, by the consumer device to the first promotion webpage;
generating clickstream data based on tracking widget views of the widgets within the first promotion webpage by tagging the widgets within the first promotion webpage,
transmitting instructions to the consumer device that configure the consumer device to monitor scrolling of the first promotion webpage and determine widgets as being viewed only when the widgets are presented on a display of the consumer device for at least a predefined period of time; and
receiving second clickstream data from the consumer device indicating those widgets determined to have been viewed;
associating the consumer device cookie with a consumer account, and associating the clickstream data with the consumer device cookie;
generating aggregate clickstream data based on combining the clickstream data associated with the consumer device cookie with clickstream data associated with one or more other consumer device cookies;
generating widget analytic data based on the aggregated clickstream data; receiving a second request, from the consumer device and via the network, for access to a second promotion webpage, the second request occurring at a point in time subsequent to the first request and being based on electronic interactions by the consumer device with the first promotion webpage;
in response to receiving the second request, generating the second promotion webpage based on the widget analytic data for widgets within the first promotion webpage, the second promotion webpage comprising widget slots and an indication of a subset of promotions selected from a plurality of candidate promotions, each promotion of the subset of promotions selected for inclusion in the second promotion webpage based on a relevance score calculated for the promotion specific to the consumer account and based on a profile of the consumer account and promotion parameters, the profile comprising transaction data from merchant devices that interact with the consumer device, the subset of promotions having highest relative relevance scores compared to other candidate promotions excluded from the subset of promotions, each widget slot associated with a promotion of the subset of promotions, and the promotion parameters comprising data specific to one of a purchase, acquisition, procurement, or consumption of one of goods, services, or experiences;
determine a widget ranking of the widgets based on the widget analytic data; and transmitting, to the consumer device and via the network, the second promotion webpage comprising widget slots populated with the widgets based on the widget ranking, the transmitting comprising enabling access, via the network, by the consumer device to the second promotion webpage, wherein the second promotion webpage is renderable for display by the consumer device, and wherein the widgets are arranged within the second promotion webpage in a predefined order.

15. The method of claim 14, wherein generating the clickstream data based on tracking widget views of the widgets includes:
associating the widgets with scrolling depths of the first promotion webpage;
transmitting instructions to the consumer device that configure the consumer device to monitor scrolling of the first promotion webpage and determine widgets as being viewed when the widgets are presented on the display of the consumer device; and
receiving second clickstream data from the consumer device indicating scrolling behavior within the first promotion webpage.

16. The method of claim 14 further comprising, by the one or more servers:
determining a traffic source associated with the request for access to the first promotion webpage;
associating the clickstream data with the traffic source; and
generating the widget analytic data based on the traffic source associated with the clickstream data.

17. The method of claim 14, wherein:
the first promotion webpage includes a buy button configured to initiate purchase of the promotion; and
the method further includes, in response to receiving consumer device input indicating selection of the buy button, associating the promotion with the consumer device cookie.

18. The method of claim 17 further comprising, by the one or more servers and in response to receiving consumer device input indicating selection of the buy button:
generating a checkout webpage including second widgets;
generating second clickstream data based on tracking widget views of the second widgets within the checkout webpage; and
associating the second clickstream data with the consumer device cookie;
generating second aggregate clickstream data based on combining the aggregate clickstream data with the second clickstream data and second clickstream data associated with the one or more other consumer device cookies; and
generating second widget analytic data based on the second aggregated clickstream data.

19. The method of claim 17, wherein:

the checkout webpage includes a checkout button; and the method further includes, by the one or more servers and in response to receiving consumer device input indicating selection of the checkout button, facilitating purchase of one or more promotions associated with the consumer device cookie.

20. The method of claim 14, wherein:

the consumer device cookie includes at least one of a consumer identifier or a session identifier; and associating the clickstream data with the consumer device cookie includes associating the clickstream data with the at least one of the consumer identifier or a session identifier.

21. The method of claim 14, wherein generating the widget analytic data based on the aggregated clickstream data includes determining viewership per widget.

22. The method of claim 14, wherein generating the widget analytic data based on the aggregated clickstream data includes determining widget viewership for different traffic sources.

23. The method of claim 14, wherein generating the widget analytic data based on the aggregated clickstream data includes determining widget viewership for different consumer segments.

24. The method of claim 14, generating the widget analytic data based on the aggregated clickstream data includes determining widget viewership for purchasers and non-purchasers of the promotion.

25. The method of claim 14 further comprising, by the one or more servers:

determining purchase funnel webpages including the first promotion webpage and a checkout webpage, each purchase funnel webpage including widget slots;

determining a priority of the widget slots across the purchase funnel webpages;

determining a widget ranking of the widgets based on the widget analytic data; and populating the widget slots based on the widget ranking.

26. The method of claim 14 further comprising, by the one or more servers:

generating the consumer device cookie; and providing the consumer device cookie to the consumer device via the network.

* * * * *